United States Patent
Grob et al.

(10) Patent No.: US 6,914,965 B1
(45) Date of Patent: Jul. 5, 2005

(54) METHOD AND APPARATUS OF PROVIDING A SINGLE STATE MOBILE UNIT IN A MODEM CONNECTION COMPRISING A WIRELESS LINK

(75) Inventors: Matthew S. Grob, San Diego, CA (US); Gadi Karmi, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 08/316,158

(22) Filed: Sep. 30, 1994

(51) Int. Cl.[7] .............. H04Q 7/20; H04Q 7/24; H04Q 7/30
(52) U.S. Cl. .............. 379/58; 379/63; 455/54.2
(58) Field of Search .............. 379/58, 59, 61, 379/63; 375/222; 455/33.1, 54.1, 54.2

(56) References Cited

U.S. PATENT DOCUMENTS

| | | | |
|---|---|---|---|
| 4,211,894 A | 7/1980 | Watanabe et al. | |
| 4,431,867 A | 2/1984 | Heatherington | 179/2 |
| 4,440,988 A | 4/1984 | Heatherington | 179/2 |
| 4,504,802 A | 3/1985 | Heatherington | 332/18 |
| 4,549,302 A | 10/1985 | Heatherington | 375/36 |
| 4,596,042 A | 6/1986 | Stangl | |
| 4,670,887 A | 6/1987 | Heatherington | 375/84 |
| 4,700,358 A | 10/1987 | Duncanson et al. | 375/8 |
| 4,718,081 A | 1/1988 | Brenig | |
| 4,723,266 A | 2/1988 | Perry | |
| 4,737,978 A | 4/1988 | Burke et al. | |
| 4,759,051 A | 7/1988 | Han | |
| 4,765,753 A | 8/1988 | Schmidt | |
| 4,811,380 A | 3/1989 | Spear | |
| 4,955,082 A | 9/1990 | Hattori et al. | |
| 5,012,489 A | 4/1991 | Burton et al. | 375/8 |
| 5,101,501 A | 3/1992 | Gilhousen et al. | |
| 5,109,390 A | 4/1992 | Gilhousen et al. | |
| 5,109,528 A | 4/1992 | Uddenfedt | |
| 5,479,480 A * | 12/1995 | Scott | 379/59 |
| 5,483,531 A * | 1/1996 | Jouin et al. | 370/79 |

* cited by examiner

*Primary Examiner*—Dwayne D. Bost
*Assistant Examiner*—Nay Aung Maung
(74) *Attorney, Agent, or Firm*—Russell B. Miller; Katherine W. White; Brian S. Edmonston

(57) ABSTRACT

An apparatus and method of providing a reliable method of entering command mode and executing modem commands with a modem comprising a wireless communications channel. A wireless communications channel inserted into a standard modem configuration splits the functions of the modem between a mobile unit and a base station. When the system enters command mode, only the base station equipment changes state. The mobile unit continues to operate in the same manner as when the system is in data mode. Any command issued in command mode requiring action from the mobile unit is first sent to the base station. The base station recognizes that the command is intended for the mobile unit and sends a mobile unit-command over an independent private command channel to the mobile unit. The mobile unit constantly monitors the private channel regardless of the state of the system. The mobile unit receives the command on the private command channel, executes the command, and returns any required result code to the terminal equipment.

10 Claims, 3 Drawing Sheets

METHOD AND APPARATUS OF PROVIDING A SINGLE STATE MOBILE UNIT IN A MODEM CONNECTION COMPRISING A WIRELESS LINK

BACKGROUND OF THE INVENTION

I. Field of the Invention

The present invention relates to communication. More particularly, the present invention relates to a novel and improved method and apparatus for commanding a modem comprising a wireless link.

II. Description of the Related Art

A variety of apparatus exists today that use standard telephone networks to convey data from one terminal to another. One of the most common terminals that uses a standard telephone network to convey data is the facsimile (FAX) machine. Like other terminal equipment that use standard telephone networks, a FAX machine uses a modem to translate digital information to audible analog tones for transmission over the telephone network. At the receiving FAX machine, a modem is used to convert the tones back into an estimate of the original digital information sent by the transmitting FAX machine.

With the deployment of cellular and personal communications wireless systems, the end user may wish to connect his terminal equipment to a mobile communications device instead of directly to a land telephone network. However, if the user attempts to send the audible tones produced by a modem over a standard analog FM cellular channel, performance will be degraded. In general, the FM cellular channel introduces a substantial amount of noise into the link compared to the standard land telephone network. The additional noise translates into errors in the estimation of the digital information when the signal is converted at the receiving end. The errors on the link can be overcome by constraining communications to lower transmission rates.

If the end user attempts to send the audible tones produced by a modem over a standard digital wireless channel, it is also doubtful that he will be successful. Digital wireless communication equipment typically uses vocoders to convert incoming voice signals into digital bits for transmission over the channel. Vocoders are tailored to sample and compress human voice. Because modem tones differ significantly from human voice, the vocoder can cause noticeable degradation to the modem tones. Also, maximizing the capacity of the system in terms of the number of simultaneous users that can be handled is extremely important in a system using a wireless link. Digitizing modem tones with a vocoder and sending them over the digital wireless link is an inefficient use of the radio channel.

A more efficient, flexible, and reliable transmission means is to provide a mechanism to transmit the digital data over the digital wireless link directly. This configuration presents some unique opportunities to take advantage of the digital link to provide high quality service.

A typical digital wireless link is not an error free channel. To provide error free communication, the wireless link protocol may provide re-transmission of lost or corrupted data. The re-transmissions introduce arbitrary and significant delays in the data. When time sensitive messages are transmitted over the wireless link, the timing of the signals may be lost thus prohibiting proper communications.

Several methods exist today that use standard telephone networks to convey data from one terminal to another. Terminals that connect by telephone networks can be FAX machines, personal computers, credit card verification machines, and telemetry devices. The standard connection of these type of devices is shown in FIG. 1. For example assume terminal equipment 10 is transmitting information to terminal equipment 50. Terminal equipment 10 produces digital data 110 representative of the information. Modem 20 converts digital data 110 to analog signal 120. Analog signal 120 is of a proper bandwidth and power level to be transferable over standard telephone network 30. Telephone network 30 conveys analog signal 120 to its destination. The telephone network may introduce noise such that output audible signal 130 is an estimate of analog signal 120. Modem 40 converts audible signal 130 to digital data 140 which is an estimate of digital data 110. Terminal equipment 50 receives digital data 140 and can act on an estimate of the information sent by terminal equipment 10. Most such links are bi-directional with the reverse functions working in the same manner as the forward.

FIG. 1 is a simplified diagram. Actual implementations of these connections can take on a variety of forms. For example in some equipment, such as a standard FAX machines, the terminal equipment and the modem reside in the same housing. Also telephone network 30 may use any of a variety of methods well known in the art to convey analog signal 120 to its destination. Such methods may include digitizing the signal and transmitting the signal via satellite to a remote location where audible signal 130 is created.

A wireless link is introduced into the configuration of FIG. 1 when a user would like to connect his terminal equipment but does not have access to a land telephone network. The user may instead have a digital mobile communications device. FIG. 2 is an exemplary embodiment of such a configuration. In FIG. 2, modem 20 has been replaced with mobile unit 60, wireless link 160, and digital signal processor (DSP) and modem 70. DSP and modem 70 resides in base station 80 which could be a standard cellular or personal communications base station also capable of handling digital and analog voice communications. FIG. 2 assumes that just one of the connections has been replaced with a wireless link. The description that follows applies equally if communication is achieved with two wireless links.

Referring to FIG. 2, assume again that terminal equipment 10 is transmitting information to terminal equipment 50. Terminal equipment 10 produces digital data 110 representative of the information. Mobile unit 60 modulates digital data 110 and provides output over wireless link 160. The signal from wireless link 160 is received by base station 80 and DSP and modem 70. DSP and modem 70 converts the digital signal to analog signal 120 which is the same signal output by modem 20 in FIG. 1. Telephone network 30 conveys analog signal 120 to its destination. Telephone network 30 may introduce noise such that output audible signal 130 is an estimate of analog signal 120. Modem 40 converts audible signal 130 to digital data 140 which is an estimate of digital data 110. Terminal equipment 50 receives digital data 140 and can act on an estimate of the information sent by terminal equipment 10. This link is bi-directional with the reverse functions working in the same manner as the forward.

Because in FIG. 2 modem 20 has been replaced with mobile unit 60, wireless link 160, and DSP and modem 70, a new partitioning of the functions of modem 20 is necessary. In addition, some new commands and new functionality are necessary to use the wireless link. Ideally this new functionality should operate independent of the terminal equipment so that no modification of the terminal equipment is necessary to support the wireless link. FIG. 3 provides a more detailed representation of an exemplary configuration of mobile unit 60. In FIG. 3, mobile unit 60 is assumed to be a mobile telephone that provides both voice and data capabilities. In an alternative embodiment, mobile unit 60 might be a dedicated single use mobile unit.

In FIG. 3, digital data 110 is connected to protocol stack 230 within mobile unit 60. Protocol stack 230 is capable of bi-directional communication with terminal equipment 10, mobile unit control processor 240 and radio modulator/demodulator 220. When protocol stack 230 receives digital data 110 for transmission over wireless link 160, it provides any required encoding and passes the encoded information to radio modulator/demodulator 220 through switch 210. Radio modulator/demodulator 220 modulates the encoded information and provides the signal for transmission to wireless link 160. Inversely when a signal containing information for terminal equipment 10 arrives, radio modulator/demodulator 220 demodulates the signal and provides it to protocol stack 230 through switch 210.

Likewise when vocoder 200 receives analog information from speaker/microphone 260 for transmission over wireless link 160, it encodes the information and passes the encoded information to radio modulator/demodulator 220 through switch 210. Radio modulator/demodulator 220 modulates the encoded information and provides the signal for transmission to wireless link 160. When a signal containing information for output on speaker/microphone 260 arrives on wireless link 160, modulator/demodulator 220 demodulates the signal and provides it to vocoder 200 through switch 210. Vocoder 200 decodes the signal and provides audible output to speaker/microphone 260.

Mobile unit control processor 240 provides control over the functions of mobile unit 60. In the prior art configuration, information intended for mobile unit control processor 240 might come either over wireless link 160 or from digital data 110. Protocol stack 230 directs information intended for mobile unit control processor 240 to it and receives commands and information for transmission from mobile unit control processor 240. Mobile unit control processor 240 also provides control functions for vocoder 200, switch 210 and radio modulator/demodulator 220.

Protocol stack 230 provides the main control center for data communication with terminal equipment 10 over wireless link 160. Protocol stack 230 may need to provide flow control. For example, digital data 110 may have a data rate that is higher than that of which wireless link 160 is capable. In this case protocol stack 230 may store the excess data and recall data at a rate appropriate for output on the link.

Protocol stack 230 also packetizes and unpacketizes data. Typically digital data 110 provided by terminal equipment 10 is a steady stream of characters. Typically wireless link 160 is packetized meaning that certain bits of information are grouped together for processing and transmission. A group of data is called a frame. Frames aid in error detection and correction. Protocol stack 230 must packetize digital data 110 provided by terminal equipment 10 into frames for radio modulator/demodulator 220 and unpacketize frames from radio modulator/demodulator 220 for digital data 110.

Protocol stack 230 must also recognize an array of special commands. For example, one function of protocol stack 230 is to compensate for the time varying delay of the digital wireless link. Protocol stack 230 recognizes time sensitive messages and translates them into, time insensitive messages for transmission over the wireless link. At the base station, the time insensitive messages are recognized and the time sensitive messages may be reconstructed with the appropriate timing.

Referring again to FIG. 1, terminal equipment 10 can produce several categories of output. Terminal equipment 10 can produce information for transfer to terminal equipment 50. Terminal equipment 10 can produce commands for modem 20 which are not to be transferred to terminal equipment 50. Because in FIG. 2, modem 20 of FIG. 1 has been replaced with mobile unit 60, wireless link 160, and DSP and modem 70, if terminal equipment 10 sends a message intended for the portion of the modem contained in the base station, DSP and modem 70 must act on command. Conversely, if terminal equipment 10 sends a message intended to control the portion of the modem contained in the mobile unit or to control the telephone functions of mobile unit 60, the message must be acted upon by mobile unit 60.

In FIG. 2, when a link is established between terminal equipment 10 and terminal equipment 50, the system is said to be in data active mode. When such a link does not exist, the system is said to be in data idle mode. In data mode and data active mode, DSP and modem 70, provide analog signal 120 in response to digital data 110.

In FIG. 2, when terminal equipment 10 sends a message intended solely for mobile unit 60 and/or DSP and modem 70, the system is said to be in command mode. In this mode, terminal equipment 10 may send command instructions or set parameters directly with mobile unit 60 and DSP and modem 70. The commands messages are not transferred into analog signal 120. Command mode can be invoked independent of an established data connection. Therefore three possible data states exist: command mode and data idle, command mode and data active, data mode and data active.

Typical prior art systems invoke command mode by a recognizable escape sequence such as described in U.S. Pat. No. 4,549,302, issued Oct. 22, 1985, entitled "MODEM WITH IMPROVED ESCAPE SEQUENCE MECHANISM TO PREVENT ESCAPE IN RESPONSE TO RANDOM OCCURRENCE OF ESCAPE CHARACTER IN TRANSMITTED DATA", assigned to Hayes Microcomputer Products, Inc. Referring again to FIG. 1, terminal equipment 10 sends the unique escape sequence indicating that modem 20 should enter command mode. Modem 20 recognizes the escape sequence and analyses any subsequent messages as commands.

In the system of FIG. 2, the escape sequence is issued in an identical manner from terminal equipment 10 which lends itself to an undesirable situation. In the prior art configuration, both mobile unit 60 and DSP and modem 70 must recognize the escape to command mode sequence. Both mobile unit 60 and DSP and modem 70 must be in the same mode to insure proper operation. For example, during an active data mode operation, terminal equipment 10 may need to command the telephone functions of mobile unit 60 for example changing operating parameters such as flow control and answer mode. To do so, terminal equipment 10 sends a message to switch mode from data mode to command mode. If either DSP and modem 70 or mobile unit 60 does not respond to the change in command, an unrecoverable error can occur. For example, if mobile unit 10 remains in data mode, it will continue to pass the commands intended for it over wireless link 160. DSP and modem 70, even though in command mode, is unable to act upon the command intended for mobile unit 10.

Another adverse result of the two state system is that a base station may be equipped to respond to commands unknown to the mobile unit. The base station also may be updated periodically with new command sets such as specialty commands associated with a single carrier. The mobile units may not be updated to recognizes these commands. If terminal equipment 10 attempts to send a new command to DSP and modem 70 which is unrecognized by mobile unit 60, mobile unit 60 may respond with an "error" message back to terminal equipment 10 instead of passing the unrecognized command over wireless link 160. Alternatively mobile unit 60 may pass the signal unrecognized to DSP and modem 70. In this case if a new command unknown to mobile unit 60 is created that indicates that the state of the system should change from command mode to data mode, mobile unit 60 remains in command mode and passes the command to DSP and modem 70. DSP and modem 70 responds by entering data mode thus creating a system having a mismatched state.

The complexity of the system is increased by the need to have both mobile unit 10 and DSP and modem 70 have a matching state. The probability of an error occurring when transistioning from one state to another also increases. Therefore to decrease the complexity and increase the reliability of the system, it is advantageous to eliminate the dual state requirement of the prior art configuration.

It is therefore the object of the present invention to provide an efficient method and apparatus for passing commands in a system comprising a wireless link.

It is a further object of the present invention to remove the dual state requirement for proper operation.

SUMMARY OF THE INVENTION

The present invention is an alternative to having each the mobile unit portion and the base station portion of a wireless modem have a command mode and a data mode. In the present invention, the mobile unit only has one "on-line" state in which it passes data over the wireless link. If the terminal equipment sends a command intended for the mobile unit, it first sends a message to enter command mode. The mobile unit passes the command indiscriminately to the base station. The base station detects the command mode indication and enters into command mode. The terminal equipment now issues a command intended for the mobile unit. The mobile unit indiscriminately passes the command to the base station. The base station recognizes the command and reflects it back to the mobile unit. When the base station reflects the command to the mobile unit, it uses an independent private command channel used for this purpose. The mobile unit constantly monitors the command channel from the base station and responds to the commands as they are received without a change in its on-line state.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
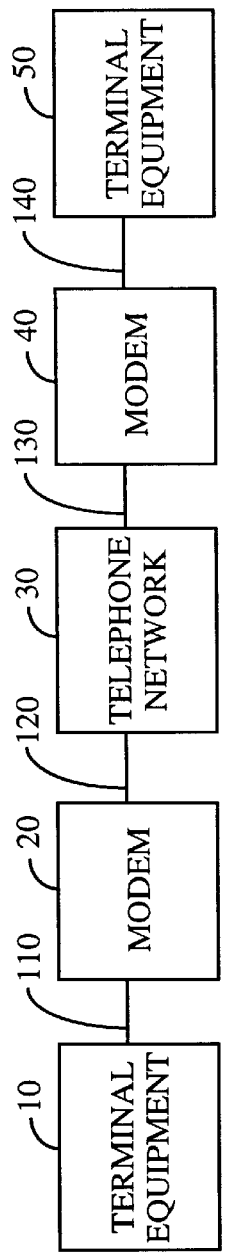
FIG. 1 is an apparatus that uses standard telephone networks to convey data from one terminal to another.
Figure 2:
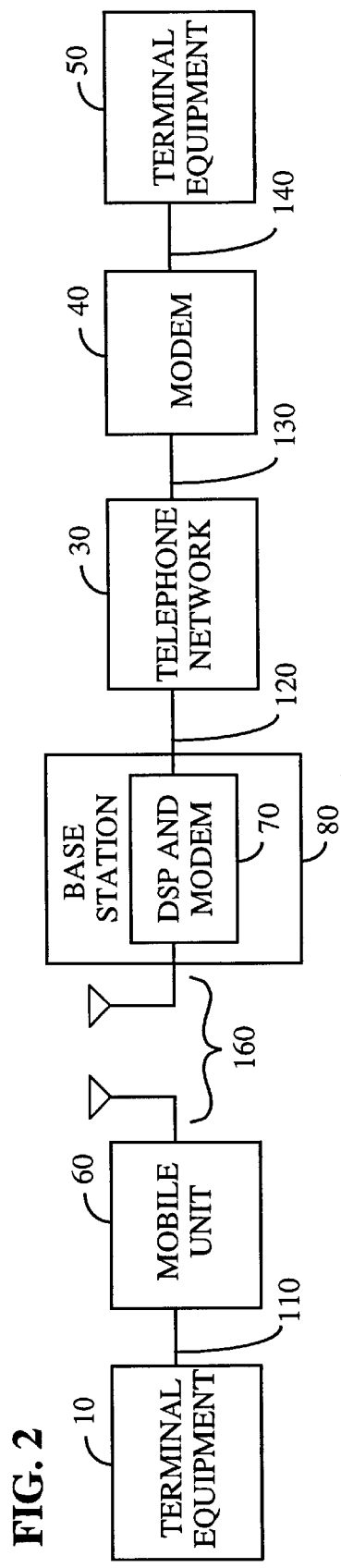
FIG. 2 is an apparatus that uses standard telephone networks and a digital wireless link to convey data from one terminal to another.
Figure 3:
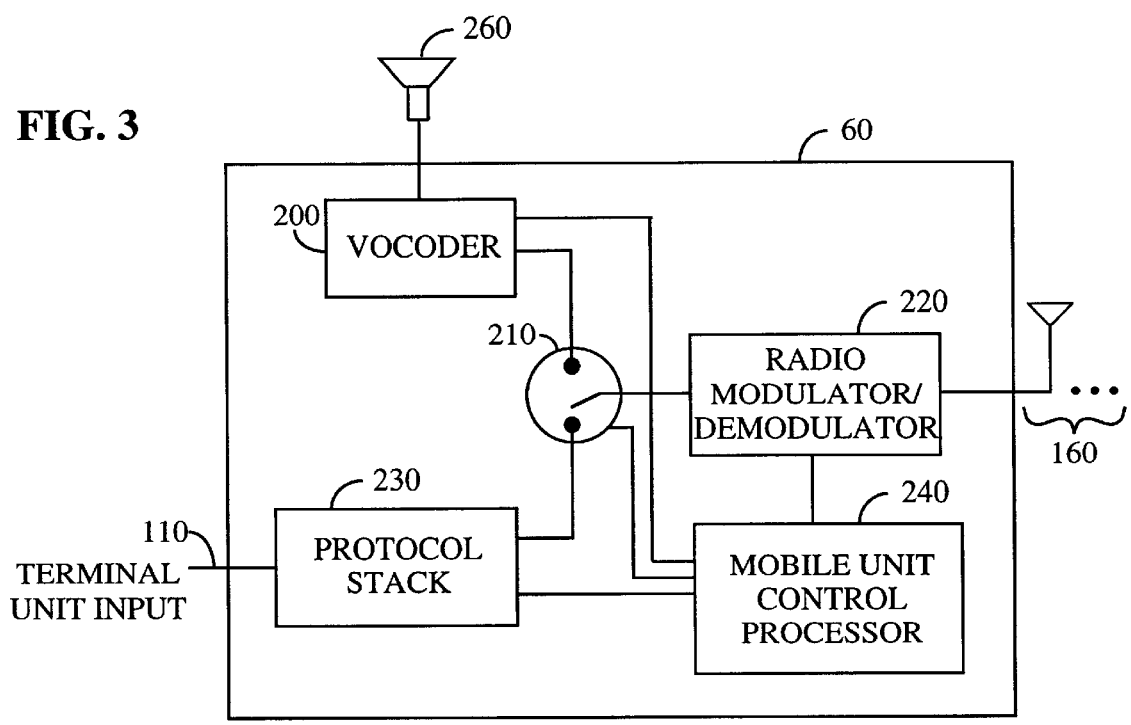
FIG. 3 is a detailed representation of an exemplary configuration of a mobile unit used to connect terminal equipment to a wireless link.

Many standard terminal equipment apparatuses exist for sending information over a wireline link using a modem. But in modern communication systems, the user may not have access to a wireline connection. Instead he has access to a wireless channel via a digital mobile communications device. FIG. 2 is an exemplary embodiment of such a configuration. In FIG. 2, a standard wireline modem has been replaced with mobile unit 60, wireless link 160, and digital signal processor (DSP) and modem 70. DSP and modem 70 resides in base station 80 which could be a standard cellular or personal communications base station also capable of handling digital and analog voice communications.

Assume that terminal equipment 10 is transmitting information to terminal equipment 50. Terminal equipment 10 produces digital data 110 representative of the information. Mobile unit 60 modulates digital data 110 and provides output over wireless link 160. The signal from wireless link 160 is received by base station 80 and DSP and modem 70. DSP and modem 70 converts the digital signal to standard wireline analog signal 120. Telephone network 30 conveys analog signal 120 to its destination.

Because in FIG. 2 modem 20 has been replaced with mobile unit 60, wireless link 160, and DSP and modem 70, a new partitioning of the functions of a standard wireline modem is necessary. In addition, some new commands and new functionality are desirable and necessary to use the wireless link. Ideally this new functionality should operate independent of the terminal equipment so that no modification of the terminal equipment is necessary to support the wireless link.

In FIG. 2, when a link is established between terminal equipment 10 and terminal equipment 50, the system is said to be in data active mode. When such a link does not exist, the system is said to be in data idle mode. In data mode and data active mode, DSP and modem 70, provide analog signal 120 in response to digital data 110.

In FIG. 2, when terminal equipment 10 sends a message intended solely for mobile unit 60 and/or DSP and modem 70, the system is said to be in command mode. In this mode, terminal equipment 10 may send command instructions or set parameters directly with mobile unit 60 and DSP and modem 70. The command messages are not transferred into analog signal 120. Command mode can be invoked independent of an established data connection. Therefore three possible data states exist: command mode and data idle, command mode and data active, data mode and data active.

Typical prior art systems invoke command mode by a recognizable -sequence such as disclosed in U.S. Pat. No. 4,549,302 referred to above. Mobile unit 60 recognizes the escape sequence and enters a command mode state. DSP and modem 70 must also recognize the command and enter command mode. Typically mobile unit 60 responds to terminal equipment 10 with a result code message such as "OK" indicating the successful completion of the transition to command mode and analyses any subsequent messages as commands. Mobile unit 60 may respond to terminal equipment 10 with a result code message such as "error" indicating the failure to execute the command. If mobile unit 60 successfully enters command mode, terminal equipment 10 may begin to send commands on digital data 110. Mobile unit 60 examines each of the commands to see what action is required.

A problem can occur in the prior art arrangement if the base station has a new feature which can be accessed by use of a new command from the terminal equipment. If terminal equipment 10 issues the new command of which mobile unit 60 is unaware, mobile unit 60 will return an error message to terminal equipment 10 thus halting further progress of the command sequence. The present invention prevents the occurrence of the mistaken error message and other averse effects of having a dual state mobile unit.

In the present invention mobile unit 60 has only one state. The one state is an on-line state in which mobile unit 60 indiscriminately passes data from terminal equipment 10 to wireless link 160 without attempting recognition of commands. In the on-line state, mobile unit 60 constantly monitors a private command channel over wireless link 160 from DSP and modem 70. Thus, if terminal equipment 10 invokes command mode by a recognizable sequence, mobile unit 60 passes the message over wireless link 160 in the same manner as it passes data over wireless link 160. DSP and modem 70 recognizes the command and enters command mode. DSP and modem 70 sends a command over the private command channel back to mobile unit 60 commanding mobile unit 60 to signal a result code message such as "OK" indicating the successful completion of the transition to command mode.

After DSP and modem 70 enters command mode, terminal equipment 10 may send commands either to mobile unit 60 or terminal equipment 10. If terminal equipment 10 issues a command for DSP and modem 70, mobile unit 60 passes it indiscriminately over wireless link 160 on the data channel. DSP and modem 70 recognizes the command, acts upon it, and sends a command to mobile unit 60 over the private command channel to signal a result code message such as "OK."

Figure 4A:
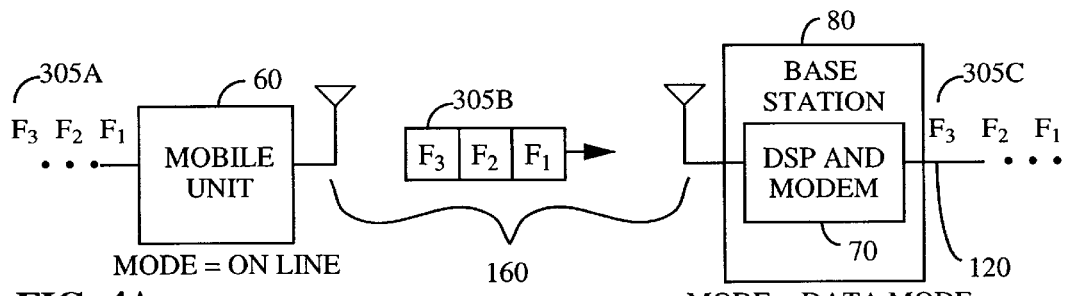
FIGS. 4A–4D illustrate in graphical form an embodiment of the present invention.

After DSP and modem 70 enters command mode, terminal equipment 10 (not shown) may issue a command for mobile unit 10 as shown in FIGS. 4A–4D. In FIG. 4A, the system is operating in data mode and data active mode. Data 305A from terminal equipment 10 is passed to mobile unit 60. Mobile unit 60 passes it indiscriminately over wireless link 160 on the data channel as data channel data 305B. In turn, DSP and modem 70 creates audible signal 305C for transmission on analog signal 120.

Figure 4B:
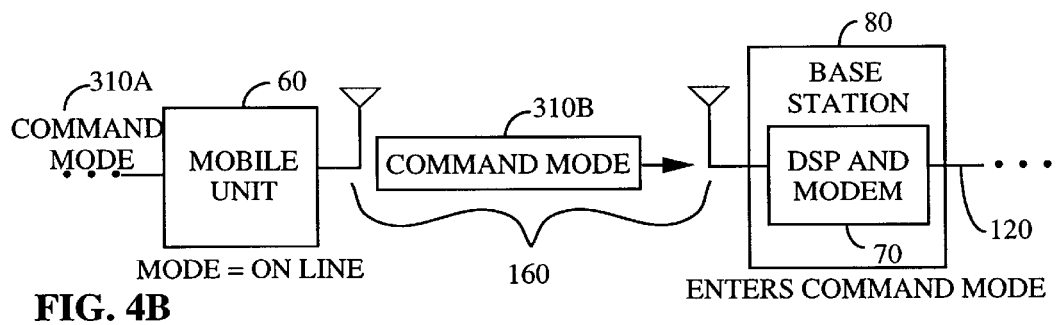
Figure 4C:
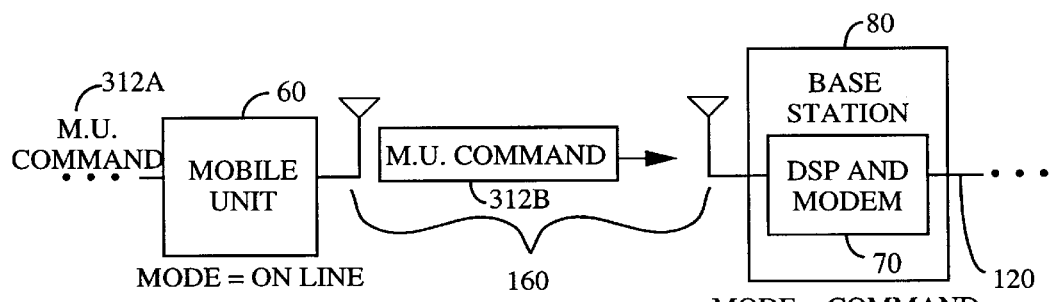
Figure 4D:
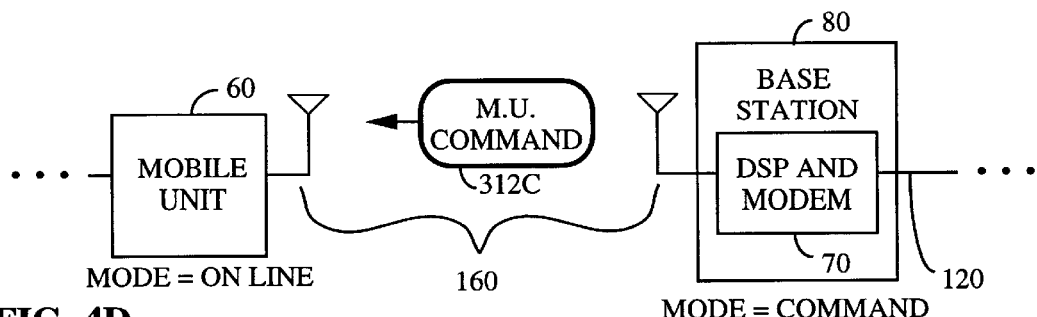

In FIG. 4B terminal equipment 10 issues an escape sequence indicating command mode. Mobile unit 60 indiscriminately passes the command over wireless link 160 on the data channel as data channel data 310B. DSP and modem 70 recognizes the escape sequence and enters into command mode. DSP and modem 70 passes no information over analog signal 120. In FIG. 4C, terminal equipment 10 has issued mobile unit command 312A which must be acted upon by mobile unit 60 for example a command to reduce the volume of a local speaker. Mobile unit 60 indiscriminately passes the command over wireless link 160 on the data channel as data channel data 312B. DSP and modem 70 recognizes the command as destined for mobile unit 60, and sends the command over wireless link 160 on the command channel as command channel data 312C to mobile unit 60. Mobile unit 60 is monitoring the command channel and receives the command. In the case mobile unite 60 reduces the volume setting of its speaker.

Methods for the creation of a private command channel are well known in the art. For example, P.N.-2812 published by the Telephone Industry Association (TIA) entitled "Mechanism for Providing a Private Channel Over a Serial Link" discloses one such method.

The present invention could be alternatively embodied to provide a single state base station unit such that only the mobile unit has a dual state. In this scenario the private command channel would be from the mobile unit to the base station. When the terminal equipment issues an escape to command mode sequence, the mobile unit would enter command mode without making any indication to the DSP and modem within the base station. If a subsequent command issued by the terminal equipment effects the base station equipment, the mobile unit would send the command to the base station over a private channel. In this case, the private channel would be a bi-directional channel. The base station would respond over the private channel indicating the successful or unsuccessful completion of the command.

There are many modifications to the present invention which can be readily seen without the use of inventive faculty. For example the wireless link may be some other type of multiple access link. Any communications channel inserted into a standard modem configuration such that the functions of the modem must be split and a link must be supported will exhibit some of the detrimental characteristics which this invention alleviates.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of conveying a modem command from a terminal equipment unit to a modem comprised of a mobile unit, a multiple access communication link, and a base station, comprising the steps of:

receiving said modem command at said mobile unit from said terminal equipment, wherein said modem command comprises a command to be executed by one of: said mobile unit, or said base station;

conveying without attempting to recognize by said mobile unit said modem command on a data channel over said multiple access communication link;

receiving said modem command at said base station;

analyzing said modem command at said base station to discern whether said modem command is to be executed by said mobile unit; and executing said modem command by said base station if said modem command comprises said command to be executed by said base station.

2. A method of conveying said modem command of claim 1 further comprising the step of conveying by said base station a result code response on said command channel over said multiple access communication link commanding said mobile unit to transmit a result code to said terminal equipment wherein said result code indicates a successful or unsuccessful completion of said command to be executed by said base station.

3. A digital communication system comprising:

terminal equipment for providing a stream of standard digital data wherein said stream of standard digital data comprises remote modem information and local equipment commands;

a mobile unit for receiving said stream of standard digital data from said terminal equipment without attempting to recognize said local equipment commands and said remote modem information, for transmitting an information signal in response to said stream of standard digital data, and for receiving a private command signal;

a wireless link for conveying said information signal and said private command signal; and a base station for receiving said information signal, for providing messaging in response to said remote modem information, and for sending said private command signal in response to said local equipment commands.

4. The digital communication system of claim 3 wherein said base station is further for receiving incoming messaging from a remote modem and providing a base station information signal in response to said incoming messaging, wherein said wireless link is further for conveying said base station information signal to said mobile unit, and wherein said mobile unit is further for receiving said base station information signal.

5. The digital communication system of claim 3 wherein said private command signal is a result code response indicating a successful or unsuccessful completion of said local modem command by said base station.

6. A method of commanding a modem communicating between a first terminal equipment unit and a second terminal equipment unit, said modem comprising a mobile unit and a base station each capable of digital communications, and wherein said first terminal equipment unit is producing digital data intended for said second terminal equipment unit, comprising the steps of:

receiving at said mobile unit said digital data from said first terminal equipment unit;

formatting at said mobile unit said digital data from said first terminal equipment unit;

modulating at said mobile unit said formatted digital data without attempting to recognize said digital data;

transmitting from said mobile unit said modulated formatted digital data on a wireless link;

receiving at said base station said transmitted modulated formatted digital data;

demodulating at said base station said received modulated formatted digital data to produce a copy of said formatted digital data;

converting at said base station said copy of said formatted digital data into a communication network message;

transmitting said communication network message over a communication network;

receiving at a remote modem said communication network message;

converting at said remote modem said communication network message into a copy of said digital data;

providing from said remote modem said copy of said digital data to said second terminal equipment unit;

receiving at said mobile unit an escape sequence from said first terminal equipment unit;

formatting at said mobile unit said escape sequence from said first terminal equipment unit;

modulating at said mobile unit said formatted escape sequence;

transmitting from said mobile unit said modulated formatted escape sequence on said wireless link;

receiving at said base station said transmitted modulated formatted escape sequence;

demodulating at said base station said received modulated formatted escape sequence;

recognizing said escape sequence at said base station and entering command mode in response thereto;

receiving at said mobile unit a base station command from said first terminal equipment unit;

formatting at said mobile unit said base station command from said first terminal equipment unit;

modulating at said mobile unit said formatted base station command;

transmitting from said mobile unit said modulated formatted base station command on said wireless link;

receiving at said base station said transmitted modulated formatted base station command;

demodulating at said base station said received modulated formatted base station command;

recognizing said base station command at said base station and acting in accordance thereto;

transmitting a result code message on a private command channel over said wireless link indicating a successful or unsuccessful completion of said base station command;

receiving at said mobile unit said result code message; and providing by said mobile unit a result code to said terminal equipment unit.

7. The method of commanding a modem of claim 6 wherein said step of transmitting said modulated formatted escape sequence on said wireless link introduces a random time distortion in said received modulated formatted escape sequence wherein said step of formatting said escape sequence comprises the steps of:

recognizing a message having a fixed timing within said escape sequence wherein said fixed timing of said message conveys information; and converting said message into a representative message having a unessential timing comprising said information.

8. A method of commanding a modem communicating between a first terminal equipment unit and a second terminal equipment unit, said modem comprising a mobile unit and a base station each capable of digital communications, and wherein said first terminal equipment unit is producing digital data intended for said second terminal equipment unit, comprising the steps of:

receiving at said mobile unit an escape sequence from said first terminal equipment unit;

formatting at said mobile unit said escape sequence from said first terminal equipment unit;

modulating at said mobile unit said formatted escape sequence without attempting to recognize said escape sequence;

transmitting from said mobile unit said modulated formatted escape sequence on said wireless link;

receiving at said base station said transmitted modulated formatted escape sequence;

demodulating at said base station said received modulated formatted escape sequence;

recognizing said escape sequence at said base station and entering command mode in response thereto;

receiving at said mobile unit a base station command from said first terminal equipment unit;

formatting at said mobile unit said base station command from said first terminal equipment unit;

modulating at said mobile unit said formatted base station command;

transmitting from said mobile unit said modulated formatted base station command on said wireless link;

receiving at said base station said transmitted modulated formatted base station command;

demodulating at said base station said received modulated formatted base station command;

recognizing said base station command at said base station and acting in accordance thereto;

transmitting a result code message on a private command channel over said wireless link indicating a successful or unsuccessful completion of said base station command;

receiving at said mobile unit said result code message; and providing by said mobile unit a result code to said terminal equipment unit.

9. The method of commanding a modem of claim 8 wherein said step of transmitting said modulated formatted escape sequence on said wireless link introduces a random time distortion in said received modulated formatted escape sequence wherein said step of formatting said escape sequence comprises the steps of:

recognizing a message having a fixed timing within said escape sequence wherein said fixed timing of said message conveys information; and converting said message into a representative message having a unessential timing comprising said information.

10. A method of conveying a modem command from a terminal equipment unit to a modem comprised of a mobile unit, a multiple access communication link, and a base station, comprising the steps of:

receiving said modem command at said mobile unit from said terminal equipment, said modem command being intended to be executed by said mobile unit;

forwarding said modem command from said mobile unit via said multiple access communication link without said mobile unit attempting to recognize said modem command;

receiving said modem command at said base station; and transmitting a private command representative of said modem command from said base station to said mobile unit.

* * * * *